US011079773B2

(12) United States Patent
Muhleman

(10) Patent No.: US 11,079,773 B2
(45) Date of Patent: Aug. 3, 2021

(54) LIGHTER-THAN-AIR VEHICLE WITH RELATIVE DRIFT NAVIGATION

(71) Applicant: The United States of America as represented by the Secretary of the Navy, San Diego, CA (US)

(72) Inventor: Daniel H. Muhleman, San Diego, CA (US)

(73) Assignee: United States of America as Represented by the Secretary of the Navy, Washington, DC (US)

( * ) Notice: Subject to any disclaimer, the term of this patent is extended or adjusted under 35 U.S.C. 154(b) by 99 days.

(21) Appl. No.: 16/661,193

(22) Filed: Oct. 23, 2019

(65) Prior Publication Data

US 2021/0124372 A1 Apr. 29, 2021

(51) Int. Cl.
*G05D 1/04* (2006.01)
*G01S 19/51* (2010.01)
*B64B 1/00* (2006.01)

(52) U.S. Cl.
CPC ............... *G05D 1/042* (2013.01); *B64B 1/00* (2013.01); *G01S 19/51* (2013.01)

(58) Field of Classification Search
CPC .. G01P 13/00; G01P 13/02; G01P 5/00; G05P 1/00; G05P 1/01; G05P 1/12; B64C 25/32; B64C 25/56; B64C 29/00; B64C 31/00; B64C 31/02; B64C 31/036; B64C 2201/00; B64C 2201/02; B64C 2201/022; B64C 2201/027; B64C 2201/028; B64C 2201/14; B64B 1/14; B64B 1/00; B64B 1/06; B64B 1/68; B64B 1/34; B64B 1/22; B64B 1/20; B64B 1/12; B64B 1/58; B64B 1/60; B64B 1/02; B64B 1/40; B64B 1/44; G01W 1/08; G01W 1/006; G01W 1/00; G01W 1/02; G01W 1/04; G05D 1/042; G05D 1/105; G05D 1/00; G05D 1/0011;

(Continued)

(56) References Cited

U.S. PATENT DOCUMENTS 3,310,982 A 3/1967 Yamron
4,817,001 A 3/1989 Lundquist
(Continued)

OTHER PUBLICATIONS

Furfaro, Roberto, et al.,"Wind-based navigation of a hot-air balloon on Titan: A feasibility study", article No. 69600C in Proceedings of SPIE—The International Society for Optical Engineering, May 2008.

*Primary Examiner* — Anthony R Jimenez
(74) *Attorney, Agent, or Firm* — Naval Information Warfare Center, Pacific; Kyle Eppele; James McGee

(57) ABSTRACT

A lighter-than-air (LTA) vehicle navigation system and vehicle. The navigation system includes a first wind probing device disposed at a first probe position, wherein the first wind probing device is in communication, via a first probe communications link, with a body communication system. The navigation system also includes a second wind probing device disposed at a second probe position, wherein the second wind probing device is in communication, via a second probe communications link, with the body communication system. The navigation system also includes a wind variation detection system configured to determine wind information, including at least a wind direction, for the first wind probing device and the second wind probing device.

20 Claims, 3 Drawing Sheets

(58) Field of Classification Search
CPC .. G05D 1/0022; G05D 1/0027; G05D 1/0202; G05D 1/04; G05D 1/10; G05D 1/101; G01C 21/20; H04B 7/18504
See application file for complete search history.

(56) References Cited

U.S. PATENT DOCUMENTS

| | | | |
|---|---|---|---|
| 6,726,120 B2 | 4/2004 | Schaffter | |
| 8,061,647 B1 | 11/2011 | Powell | |
| 8,864,063 B2 * | 10/2014 | Heppe | B64B 1/00 244/30 |
| 9,540,091 B1 | 1/2017 | Maccallum | |
| 9,658,618 B1 | 5/2017 | Knoblach | |
| 9,665,103 B1 | 5/2017 | Bonawitz | |
| 9,800,091 B2 * | 10/2017 | Nugent, Jr. | B64C 39/022 |
| 1,016,815 A1 | 1/2019 | Ribeiro | |
| 1,040,435 A1 | 9/2019 | Van Wynsberghe | |
| 2017/0331177 A1 * | 11/2017 | MacCallum | B64B 1/40 |

* cited by examiner

LIGHTER-THAN-AIR VEHICLE WITH RELATIVE DRIFT NAVIGATION

STATEMENT OF GOVERNMENT INTEREST FEDERALLY-SPONSORED RESEARCH AND DEVELOPMENT

The United States Government has ownership rights in this invention. Licensing inquiries may be directed to Office of Research and Technical Applications, Naval Information Warfare Center, Pacific, Code 72120, San Diego, Calif., 92152; telephone (619)553-5118; email: ssc_pac_t2@navy.mil. Reference Navy Case No. 104,138.

BACKGROUND OF THE INVENTION

Description of Related Art

Lighter-than-air vehicles may need to change their positions over Earth. Wind power may be an option for powering such vehicles' changes of position. However, at very high altitudes, such as the stratosphere, wind data is generally not available to such lighter-than-air vehicles. In addition, the stratosphere is extremely cold with low air density. Stratospheric conditions may be inhospitable to various electronics. Therefore, there is a need for lighter-than-air vehicles that can access wind data locally with a reduced reliance on electronics.

Dish antennas are widely used to provide high gain and directionality. The dish portion of the antenna is ordinarily of fixed shape, or occasionally collapsible/expandable via a system of ribs which provide the desired shape. For lighter-than-air vehicle applications, there is a need for large dish antennas that do not put excessive size and weight burdens upon the vehicle. The antenna may be treated as a distinct portion of the system. In some cases, conformal antennas (typically phased array antennas) are embedded into the surface of an airborne vehicle, but these antennas may be limited to smaller apertures/gains. Conformal antennas have also been painted onto airships, but their gain is limited.

BRIEF SUMMARY OF INVENTION

The present disclosure provides a lighter-than-air vehicle with a lighter-than-air vehicle navigation system. In accordance with one embodiment of the present disclosure, the vehicle navigation system comprises a first wind probing device disposed at a first probe position. The first wind probing device is in communication, via a first probe communications link, with a body communication system. The navigation system also includes a second wind probing device disposed at a second probe position. The second wind probing device is in communication, via a second probe communications link, with the body communication system. The navigation system also includes a wind variation detection system configured to determine wind information, including at least a wind direction, for the first wind probing device and the second wind probing device.

These, as well as other objects, features and benefits will now become clear from a review of the following detailed description, the illustrative embodiments, and the accompanying drawings.

BRIEF DESCRIPTION OF DRAWINGS

The accompanying drawings, which are incorporated in and form a part of the specification, illustrate example embodiments and, together with the description, serve to explain the principles of the lighter-than-air vehicle and navigation system. In the drawings.

DETAILED DESCRIPTION OF THE INVENTION

Disclosed herein is a lighter-than-air vehicle and navigation system that can strategically use varying wind directions and speeds to change the vehicle's position over the Earth or maintain it. The present lighter-than-air vehicle and navigation system do not require propelling to accomplish changes in the vehicle's position. This strategic use of wind allows the lighter-than-air vehicle to navigate to a desired location above the earth and/or to persist in such a location. The present vehicle and navigation system may determine whether more favorable winds can be found at higher or lower altitudes, or other latitudes and longitudes, relative to the lighter-than-air vehicle. When navigating to a new location, the present vehicle and navigation system may also benefit from collection of wind data at other latitudes/longitudes/altitudes along possible paths to the desired location, in which case multiple probes can be utilized to characterize wind speed and direction over a volume of altitude, latitude, and longitude.

The lighter-than-air vehicle described herein may be any type of aerial vehicle. For example, the presently described vehicle may be an airship or a hot air balloon. The navigation system, which may be incorporated into the vehicle, can efficiently identify the relative direction and speed of winds at different positions, including different altitudes/latitudes/longitudes than the vehicle's current altitude, so that the vehicle can adjust its altitude to take advantage of favorable winds and thus be moved to a desired location. The present navigation system calculates speed at some scale, but it may not necessarily be a standardized measurement of the actual mean rate of air molecules moving (i.e. true wind speed), but rather a substantially accurate measurement of the vehicle's drift rate. The vehicle's drift rate is not necessarily identical to the true wind speed, but it ultimately provides sufficient wind information for the navigation system.

Figure 1:
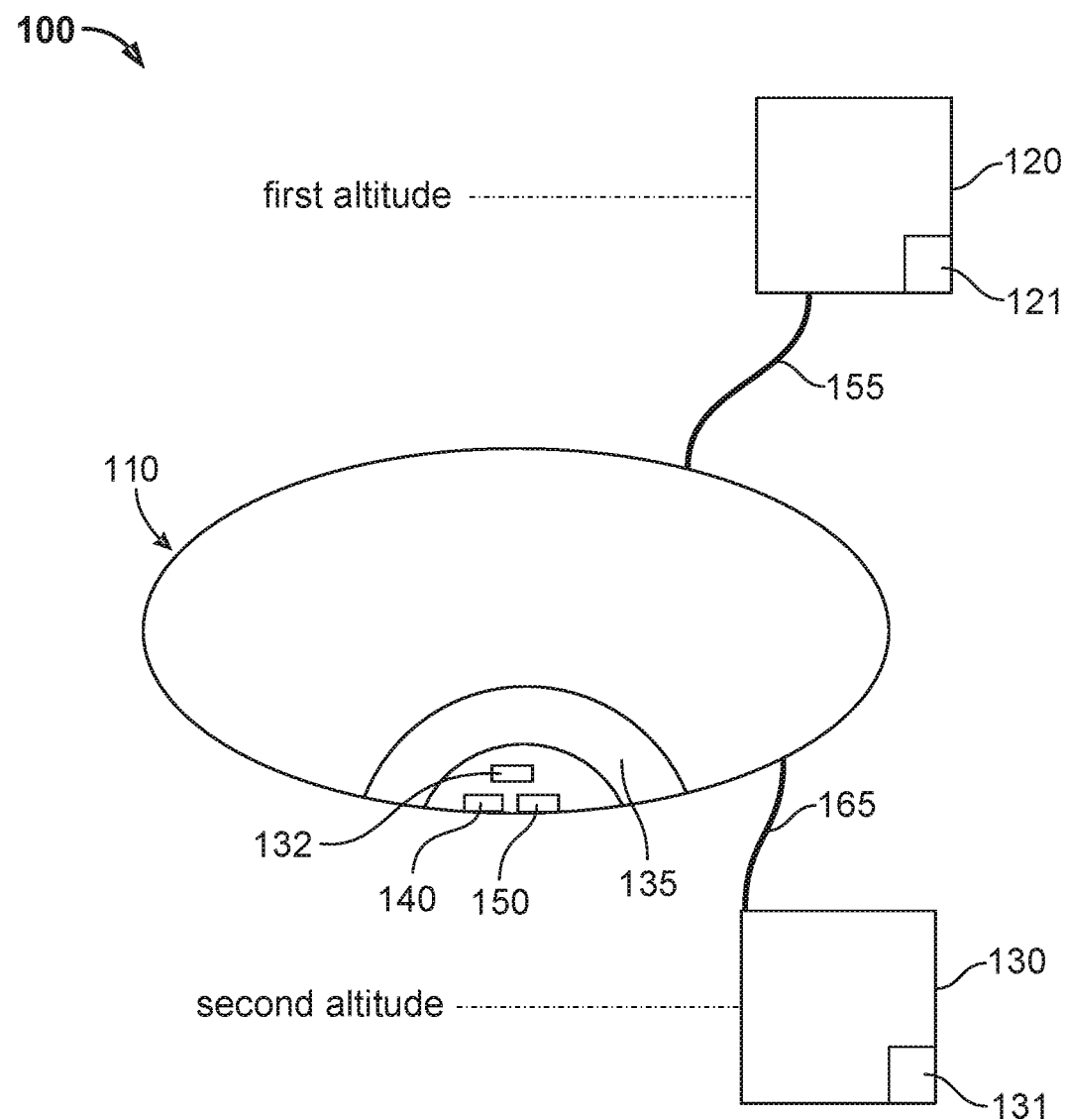
FIG. 1 is an illustration of a lighter-than-air vehicle in accordance with one embodiment of the present disclosure.

FIG. 1 shows a lighter-than-air vehicle 100 that includes a main body 110 and may include one or more smaller lighter-than-air vehicles (hereafter referred to sometimes as "wind probing vehicle(s)" or "wind probing devices") such as first wind probing device 120 and second wind probing device 130. The main body 110 may belong to an airship or balloon, and may be inflatable using helium.

Wind probing devices 120 and 130 may be used to probe or scout the winds at positions other than the position of the main body 110—including different altitudes, latitudes, and/or longitudes—so that the strengths and directions of those winds at other positions can be used to determine optimal altitude adjustments for moving the main body 110 to (or maintaining it in) its desired location.

It may be desirable for each of wind probing devices 120 and 130 to have aerodynamic characteristics similar to the main body 110 so that the drift it experiences is consistent with that which would be experienced by the main body 110.

A navigation solution (such as a global positioning system (GPS)) may be required for one or more of the wind probing devices 120 and 130. Some means of communication may also be required to, and preferably from, the system navigation control. Thus, each of said wind probing devices 120, 130 may have an associated navigation system. More particularly, the first wind probing device 120 may have a first wind probe navigation system 121. Similarly, second wind probing device 130 may have a second wind probe navigation system 131.

The present vehicle and navigation system provide for measurement of relative wind direction/speed at other positions by measuring the relative drift of wind probing devices 120, 130 to the main body 110 and located at different positions, including altitudes (e.g., one higher and one lower). The altitude of the main body 110 may be adjusted so that the main body 110 moves to (or remains at) an altitude with winds more favorable to moving the main body 110 to (or keeping it in) its desired location.

The present vehicle and navigation system disclosed herein allows for wind-based navigation without a priori knowledge of the winds and without extensive infrastructure to take wind measurements.

The wind probing devices 120, 130 may sense and determine wind information, including direction and, to some extent, speed. The wind probing devices 120, 130 may be located at different positions (including different altitudes, latitudes and longitudes), and the vehicles' drifts may be determined relative to the main body 110. The different probe positions for wind probing devices 120, 130 may be monitored by the vehicle navigation system to identify relative wind direction and speed at the other altitudes, latitudes and longitudes. An electronics bay 135 disposed in main body 110 may include a body communication system 132. The electronics bay 135 may also include a wind variation detection system 140, which may sense a direction and speed of a wind at the first probing device 120 and the second probing device 130. In this manner, decisions to adjust the position, e.g., altitude, of the main body 110 can be made so as to move the vehicle 100 closer to a desired location.

The wind variation detection system 140 may identify where currents/air flows are that, if followed, lead the lighter-than-air vehicle to a desired location. The wind variation detection system 140 may determine wind direction by calculating the vectors between multiple location measurements of the probing devices 120, 130. Effective wind speed may be calculated by dividing those measurements by the change in time between them. Kalman filtering may be used to smooth results. These calculations may be made onboard the probing devices 120 and 130 or the vehicle 100. The wind variation detection system 140 may be a part of the overall controls/electronics for main body 110. The wind variation detection system 140 may obtain data from the probing devices 120, 130, and could be as simple as tracking multiple GPS points. Each of the probing devices 120, 130 could periodically send its GPS coordinates, e.g., every second. The wind variation detection system 140 could look at GPS coordinates and determine how far and where the main body 110 and/or the probing devices 120, 130 traveled over time. The wind variation detection system 140 could use trigonometry to determine the angle or direction of the vector and then the distance to Earth to get wind velocity. Light detection and ranging (LIDAR) may also be used to make additional wind speed and direction measurements over a volume near one or more probing devices 120, 130 and/or the main body 110.

The present lighter-than-air navigation system and vehicle may leverage existing winds to propel the main body 110 or other portion of the lighter-than-air vehicle 100 in the desired direction.

An altitude adjustment mechanism 150 may be located within the main body 110 and optionally within one or more of the wind probing devices 120, 130. The adjustment mechanism 150 may be an air bladder or other means of adjusting the buoyancy of the main body 110.

Lighter-than-air vehicles have potential utility for a number of applications. For example, a lighter-than-air vehicle, when compared to an airplane or unmanned aerial vehicle (UAV), may have a higher relative transport efficiency, and a longer flight time or loiter capability (useful for applications like communications, overhead imagery, RADAR, surveillance, etc.).

The present lighter-than-air vehicle provides for measurement of relative wind direction/speed at other altitudes by measuring the relative drift of wind probing devices 120, 130, tethered or untethered, to the main body 110. Under some circumstances, it may be desirable to tether the wind probing devices 120, 130 to main body 110 so that they remain within a certain distance from the main body 110. In this instance, a first tethered connection 155 may tether or otherwise connect the main body 110 to first wind probing device 120. Similarly, a second tethered connection 165 may tether or otherwise connect the main body 110 to second wind probing device 130. However, under some circumstances, tethering may be impractical or heavy, and thus, tethering via a tethered connection, e.g., first tethered connection 155 or second tethered connection 165, is optional for the present navigation system and lighter-than-air vehicle.

If a tethered connection is used between the main body 110 and each of the first and second wind probing devices 120, 130, then the tether may also include a wired communications link. For example, the first tethered connection 155 may serve as a wired or wireless communications link between the first wind probing device 120 and the main body 110. Similarly, the second tethered connection 165 may serve as a communications link between the second wind probing device 130 and the main body 110. Accordingly, the first wind probing device 120 is disposed at a first position, and the first wind probing device is in communication, via a first probe communications link, with a body communication system 132. Similarly, the second wind probing device 130 is disposed at a second position, and the second wind probing device is in communication, via a second probe communications link, with a the body communication system 132.

When tethering is removed, there is also greater flexibility in the altitudes of wind probing devices 120, 130. Moreover, lack of tethering may result in a simpler calculation of the impacts of a potential altitude change on the main body 110, especially if either of wind probing devices 120, 130 is aerodynamically similar.

Figure 2:
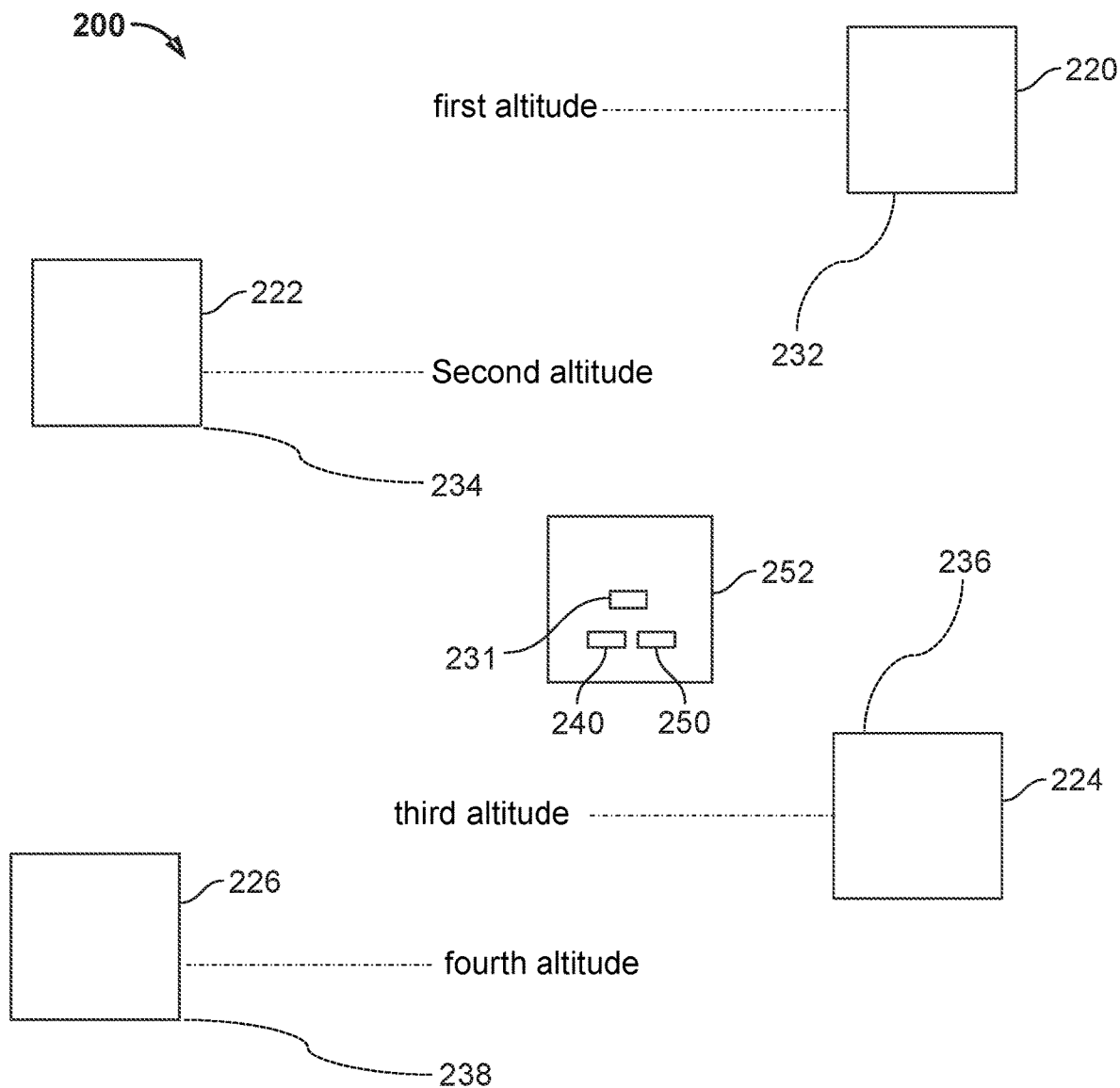
FIG. 2 is a block diagram of a lighter-than-air navigation system in accordance with one embodiment of the present disclosure.

The lighter-than-air navigation system described herein may be available separately from, or conversely in combination with, a lighter-than-air vehicle. Referring now to FIG. 2, illustrated is a lighter-than-air navigation system 200 in accordance with one embodiment of the present disclosure. In this embodiment, the lighter-than-air navigation system 200 may be combined with an existing lighter-than-air vehicle (not shown).

In FIG. 2, the lighter-than-air navigation system 200 includes multiple wind probing devices 220, 222, 224, 226 at different positions. The relative positions of the wind probing devices 220, 222, 224, 226 to an airship or other aerial vehicle (not shown) may be used by the airship navigation to identify the relative wind direction and speed at those different probe positions compared to the wind direction/speed at the position of airship or other aerial vehicle (not shown). For purposes of the present disclosure, probe position may include a latitude, longitude and/or altitude of one of the wind probing devices 220, 222, 224, 226.

In addition to wind probing devices 220, 222, 224, 226, additional wind probing vehicles or other wind probing devices/objects (not shown) may be provided. As far as the appropriate number of wind probing devices, the number may vary according to the application and resources. It may be desirable to have a minimum of two wind probing devices so that at least two potential directions of movement are available in order for the lighter-than-air vehicle to avail itself of favorable winds. Also by way of example, one could have a larger number of wind probing devices, e.g., twenty (20) or more wind probing devices, for greater system granularity. A larger number of wind probing devices may also be desirable where the wind probing devices were being released for some reason, or were otherwise unavailable after a period of time.

Each of said wind probing devices 220, 222, 224, 226 may be disposed at a distinct position or altitude, and may be in communication with the body communication system 231 via first communications link 234, second communications link 236, third communications link 238 and/or fourth communications link. Communications links 232, 234, 236, 238 may be wireless communications links or other communications links that are suitable for communications among the wind probing devices 220, 222, 224, 226 and a lighter-than-air vehicle, as is known in the art. The wind probing devices 220, 222, 224, 226 may act as wind scouts that determine the most favorable wind. Each of the wind probing devices 220, 222, 224, 226 may include a basic navigational mechanism such as a GPS device that periodically reports the probe position of each of the wind probing devices 220, 222, 224, 226.

Wind probing devices 220, 222, 224, 226 may be lighter-than-air vehicles that are smaller than the lighter-than-air vehicle that is to be guided via relative wind. Wind probing devices 220, 222, 224, 226 may have similar aerodynamic characteristics to a larger primary vehicle (not shown) or the main body (not shown) of such a larger primary vehicle. The altitude of wind probing devices 220, 222, 224, 226 may be adjusted in advance of the larger primary vehicle or main body (not shown) so that the nearby winds at other altitudes (or simply their effect on vehicle drift) can be characterized in advance of changing the altitude of the primary vehicle or main body (not shown). Propellers (not shown) or other appropriate mechanisms may be included for maneuvering the vehicle and/or controlling orientation.

A body communication system 231, a wind variation detection system 240 and an altitude adjustment mechanism 250 may be disposed in an electronics module 252. When in use, the electronics module 252 may reside on the main body/primary vehicle (not shown) or a wind probing vehicle (not shown) that is to be guided in accordance with the navigation system described herein.

It may be desirable to use the present lighter-than-air vehicle with a high-gain antenna in order to improve communications capabilities. Large antenna dishes provide for high antenna gain, enabling higher data rate communications, signals intelligence (SIGINT) collection, and various other applications.

Figure 3:
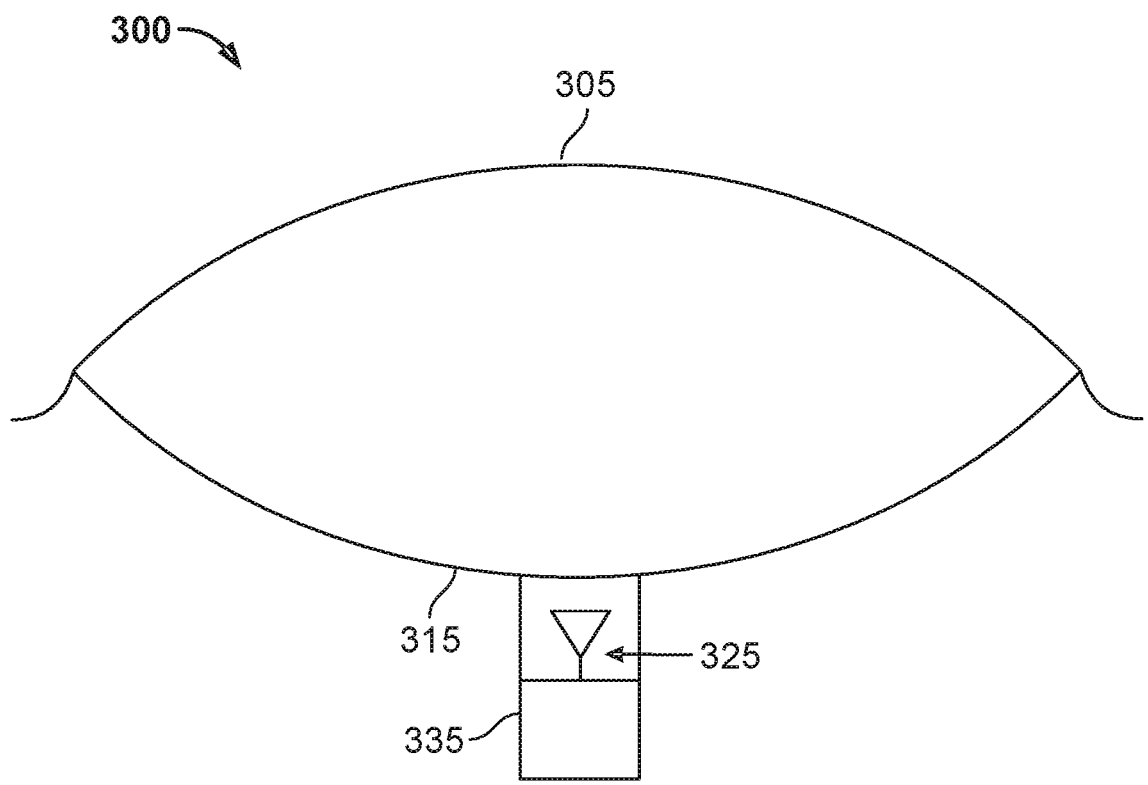
FIG. 3 is an illustration of a lighter-than-air vehicle with a dish antenna in accordance with one embodiment of the present disclosure.

Referring now to FIG. 3, illustrated is a lighter-than-air vehicle with a dish antenna in accordance with one embodiment of the present disclosure. The lighter-than-air vehicle 300 in FIG. 3 has a first exterior portion 305 of a main body 310 (e.g., the skin of an aerostat or the balloon of a hot-air-balloon) that is made of a reflective material. The first exterior portion 305 of the lighter-than-air vehicle 300 that is used to provide lift (e.g., the balloon portion of a hot-air balloon or the skin of an aerostat) may serve as the reflective dish of a dish antenna. This enables a large, high gain antenna that is capable of flight. The first exterior portion 305 of the main body 310 also has a parabolic (or other appropriate) shape so as to serve as the reflector for a dish antenna.

A second exterior portion 315 of the main body 310 may be non-reflective so as to allow radio waves to pass through.

It should also be noted that, in the present embodiment, the entire first exterior portion 305 on the entire top side of the lighter-than-air vehicle 300 may be used as a reflector. However, it should be understood that the entire top side need not be used as reflector; a smaller portion could be used as particular use cases require. Ribbing (also not depicted) may be needed to maintain an adequate parabolic shape for the first exterior portion 305 that serves as reflective material for the high gain antenna.

Antenna feed 325 may be a standard antenna feed. Antenna feed 325 is the location on the antenna where the feedline from the receiver or transmitter connects or attaches to the antenna. Associated cables for the antenna feed 325 may be fed from or to the electronics/payload compartment 335. Of course, for wireless communications, such cables may not be necessary.

The foregoing description of various embodiments has been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A lighter-than-air (LTA) vehicle navigation system, comprising:

a first wind probing device disposed at a first probe position, wherein the first wind probing device is in communication, via a first probe communications link, with a body communication system;

a second wind probing device disposed at a second probe position, wherein the second wind probing device is in communication, via a second probe communications link, with the body communication system; and a wind variation detection system configured to determine wind information, including at least a wind direction, for the first wind probing device and the second wind probing device, wherein the navigation system is configured to indicate a change in position of at least a portion of an LTA vehicle based on wind information received from the wind variation detection system.

2. The navigation system of claim 1, wherein a portion of an exterior of a main body of the LTA vehicle is composed at least in part of a reflective material, wherein said portion of the exterior of the main body has a substantially parabolic shape of a reflector for a dish antenna, and wherein another portion of the exterior of the main body is composed at least in part of a non-reflective material so radio waves pass through the non-reflective material of the exterior of the main body.

3. The navigation system of claim 1, wherein the first wind probing device communicates to a main body of the LTA vehicle, via the first probe communications link and a first probe navigation system, GPS coordinates of the first wind probing device, and wherein the second wind probing device communicates to the main body, via the second probe communications link and a second probe navigation system, GPS coordinates of the second wind probing device.

4. The navigation system of claim 1, wherein the first probe communications link and the second probe communications link form part of the wind variation detection system.

5. The navigation system of claim 1, further comprising:
one or more additional wind probing devices, each of the one or more additional wind probing devices being disposed at a respective additional probe position, wherein the one or more additional wind probing devices are in communication with said body communication system.

6. The navigation system of claim 1, wherein the wind variation detection system includes a light detection and ranging system.

7. The navigation system of claim 1, further comprising:
an altitude adjustment mechanism configured to adjust a position of at least a portion of the LTA vehicle based on the wind information received from the wind variation detection system.

8. The navigation system of claim 7, wherein the altitude adjustment mechanism is disposed in a main body of the LTA vehicle.

9. A lighter-than-air (LTA) vehicle, comprising:
a main body;
a first wind probing device disposed at a first probe position, wherein the first wind probing device is in communication, via a first probe communications link, with a body communication system that is disposed in the main body;
a second wind probing device disposed at a second probe position, wherein the second wind probing device is in communication, via a second probe communications link, with the body communication system that is disposed in the main body;
a wind variation detection system configured to determine wind information, including at least a wind direction, for the first wind probing device and the second wind probing device; and
an altitude adjustment mechanism configured to adjust a position of at least a portion of the LTA vehicle for changing a position of the LTA vehicle based on wind information that is received from the wind variation detection system.

10. The vehicle of claim 9, wherein the altitude adjustment mechanism is disposed in the main body of the vehicle.

11. The vehicle of claim 9, wherein a portion of an exterior of the main body is made of a reflective material, wherein said portion of the exterior of the main body has a substantially parabolic shape of a reflector for a dish antenna, and wherein another portion of the exterior of the main body is non-reflective so radio waves pass through the another portion of the exterior of the main body.

12. The vehicle of claim 9, wherein the first wind probing device communicates to the main body, via a first probe communications link and a first probe navigation system, GPS coordinates of the first wind probing device, and wherein the second wind probing device communicates to the main body, via a second probe communications link and a second probe navigation system, GPS coordinates of the second wind probing device.

13. The vehicle of claim 9, wherein the first probe communications link and the second probe communications link form part of the wind variation detection system.

14. The vehicle of claim 9, further comprising:
one or more additional wind probing devices, each of the one or more additional wind probing devices being disposed at a respective additional probe position, wherein the one or more additional wind probing devices are in communication with said body communication system.

15. The vehicle of claim 9, wherein the wind variation detection system includes a light detection and ranging system.

16. A lighter-than-air (LTA) vehicle with dish antenna, comprising:
a main body;
a first wind probing device disposed at a first probe position, wherein the first wind probing device is in communication, via a first probe communications link, with a body communication system that is disposed in the main body;
a second wind probing device disposed at a second probe position, wherein the second wind probing device is in communication, via a second probe communications link, with the body communication system that is disposed in the main body;
a wind variation detection system configured to determine wind information, including at least a wind direction, for the first wind probing device and the second wind probing device; and
an altitude adjustment mechanism configured to adjust a position of at least a portion of the LTA vehicle for changing a position of the LTA vehicle based on wind information that is received from the wind variation detection system,
wherein a portion of an exterior of the main body is made of a reflective material, wherein said portion of the exterior of the body has a substantially parabolic shape of a reflector for a dish antenna, and wherein another portion of the exterior of the main body is non-reflective so radio waves pass through the another portion of the exterior of the main body.

17. The vehicle of claim 16, wherein the altitude adjustment mechanism is disposed in the main body of the vehicle.

18. The vehicle of claim 16, further comprising:
one or more additional wind probing vehicles, each of the one or more additional wind probing vehicles being disposed at a respective additional probe position, wherein the one or more additional wind probing vehicles are in communication with said body communication system.

19. The vehicle of claim 16, wherein the wind variation detection system includes a light detection and ranging system.

20. The vehicle of claim 16, wherein the first wind probing device communicates to the main body, via a first probe communications link and a first probe navigation system, GPS coordinates of the first wind probing device, and wherein the second wind probing device communicates to the main body, via a second probe communications link and a second probe navigation system, GPS coordinates of the second wind probing device.

\* \* \* \* \*